(12) United States Patent
Tutmark

(10) Patent No.: US 9,132,317 B2
(45) Date of Patent: Sep. 15, 2015

(54) GOLF BALL WITH THIN COVER AND METHOD OF MAKING GOLF BALL WITH THIN COVER

(75) Inventor: Bradley C. Tutmark, Aloha, OR (US)

(73) Assignee: NIKE, Inc., Beaverton, OR (US)

( * ) Notice: Subject to any disclaimer, the term of this patent is extended or adjusted under 35 U.S.C. 154(b) by 477 days.

(21) Appl. No.: 13/474,166

(22) Filed: May 17, 2012

(65) Prior Publication Data

US 2013/0310199 A1 Nov. 21, 2013

(51) Int. Cl.
*A63B 37/12* (2006.01)
*A63B 37/00* (2006.01)
*A63B 45/00* (2006.01)
*B29L 31/54* (2006.01)
*B29C 49/04* (2006.01)

(52) U.S. Cl.
CPC ......... *A63B 37/0019* (2013.01); *A63B 37/0003* (2013.01); *A63B 37/0024* (2013.01); *A63B 37/0033* (2013.01); *A63B 45/00* (2013.01); *A63B 37/0004* (2013.01); *A63B 37/0076* (2013.01); *B29C 49/04* (2013.01); *B29C 2791/006* (2013.01); *B29L 2031/546* (2013.01)

(58) Field of Classification Search
USPC .................................................. 473/351–378
See application file for complete search history.

(56) References Cited

U.S. PATENT DOCUMENTS

| | | | | |
|---|---|---|---|---|
| 696,351 A | * | 3/1902 | Richards | 473/368 |
| 696,353 A | * | 3/1902 | Richards | 473/368 |
| 697,920 A | * | 4/1902 | Kempshall | 473/368 |
| 697,926 A | * | 4/1902 | Richards | 473/367 |
| 697,927 A | * | 4/1902 | Richards | 473/368 |
| 699,632 A | | 5/1902 | Richards | |
| 699,813 A | * | 5/1902 | Richards | 473/368 |
| 701,617 A | * | 6/1902 | Richards | 473/368 |
| 701,737 A | * | 6/1902 | Kempshall | 473/368 |
| 701,765 A | * | 6/1902 | Richards | 473/368 |
| 701,766 A | * | 6/1902 | Richards | 473/368 |
| 703,000 A | * | 6/1902 | Richards | 473/368 |
| 1,202,318 A | | 10/1916 | Roberts | |
| 1,329,310 A | * | 1/1920 | Roberts | 473/358 |
| 2,229,170 A | * | 1/1941 | Greene | 473/354 |
| 4,447,373 A | * | 5/1984 | Chappell et al. | 264/4 |
| 4,660,834 A | * | 4/1987 | Carrigan | 473/165 |
| 4,681,323 A | * | 7/1987 | Alaki et al. | 473/384 |
| 4,783,078 A | * | 11/1988 | Brown et al. | 473/362 |
| 5,480,155 A | * | 1/1996 | Molitor et al. | 473/354 |
| 5,703,166 A | * | 12/1997 | Rajagopalan et al. | 525/196 |
| 6,068,561 A | | 5/2000 | Renard et al. | |
| 6,290,797 B1 | | 9/2001 | Gosetti et al. | |
| 6,299,550 B1 | | 10/2001 | Molitor et al. | |
| 6,336,871 B1 | | 1/2002 | Ihara et al. | |
| 6,699,027 B2 | * | 3/2004 | Murphy et al. | 425/116 |
| 6,776,731 B2 | * | 8/2004 | Shannon et al. | 473/384 |
| 6,855,077 B2 | * | 2/2005 | Tzivanis et al. | 473/384 |

(Continued)

*Primary Examiner* — Alvin Hunter

(74) *Attorney, Agent, or Firm* — Honigman Miller Schwartz & Cohn LLP; Anna M. Budde; Jonathan P. O'Brien

(57) ABSTRACT

A method of manufacturing a golf ball includes molding a cover preform in a first mold. The cover preform is placed in a second mold. Material is injected into an interior of the cover preform. The material forces the cover preform against a surface of the second mold to form dimples in the cover. The dimples may extend through the cover to form dimple structures in at least one layer between the cover and a center of the golf ball. For instance, the dimples may extend through the cover and into the injected material. The dimples may have a depth greater than a thickness of the cover.

15 Claims, 12 Drawing Sheets

(56) References Cited

U.S. PATENT DOCUMENTS

| | | | |
|---|---|---|---|
| 6,896,629 B2 * | 5/2005 | Shannon et al. ............. 473/384 |
| 7,285,059 B2 | 10/2007 | Sullivan et al. |
| 7,448,965 B2 | 11/2008 | Kawamatsu |
| 7,946,932 B2 | 5/2011 | Sullivan et al. |
| 2008/0015054 A1 | 1/2008 | Kennedy, III et al. |

* cited by examiner

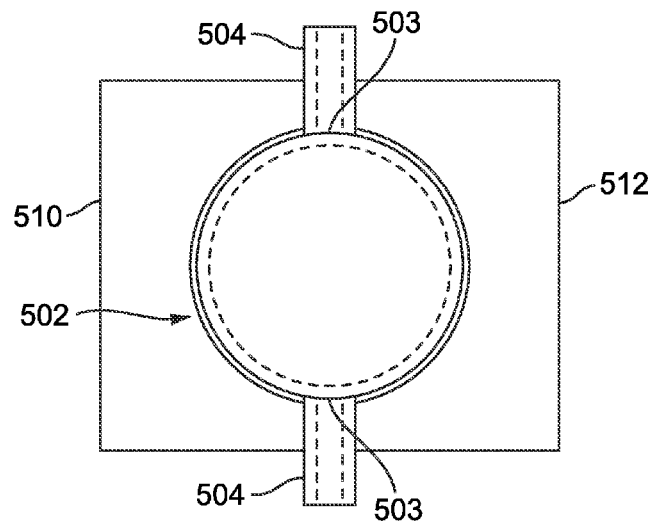
FIG. 7
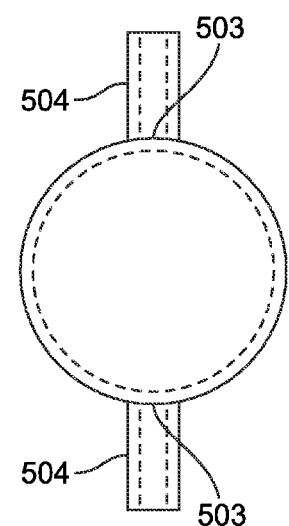
FIG. 8
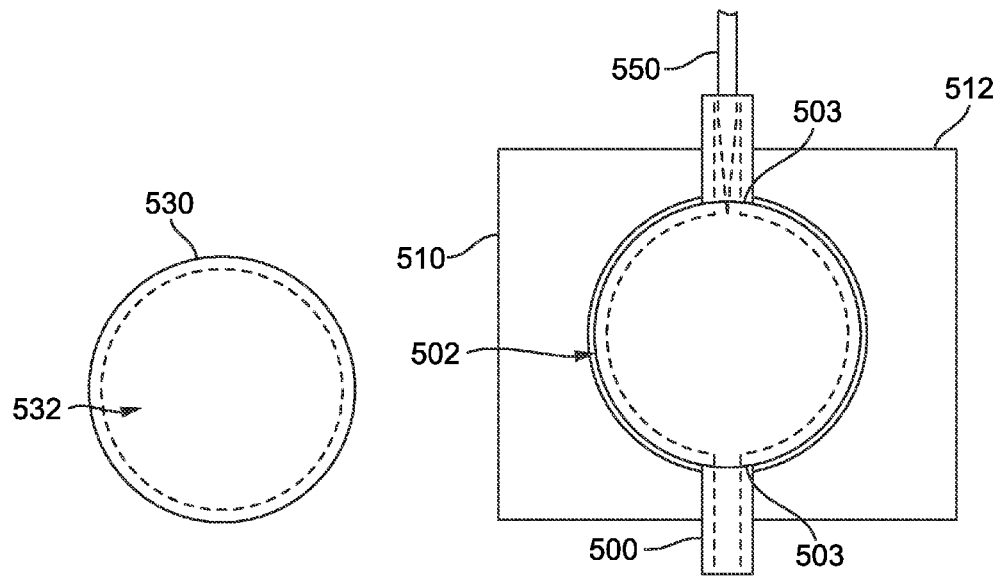
FIG. 9
FIG. 10

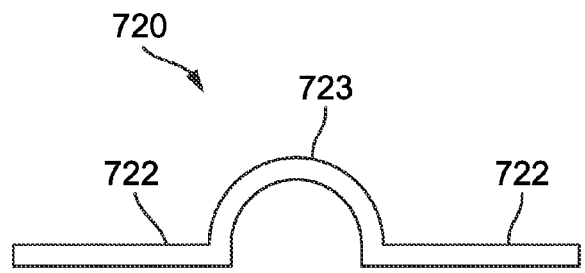
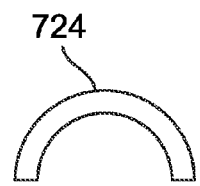
FIG. 20      FIG. 21
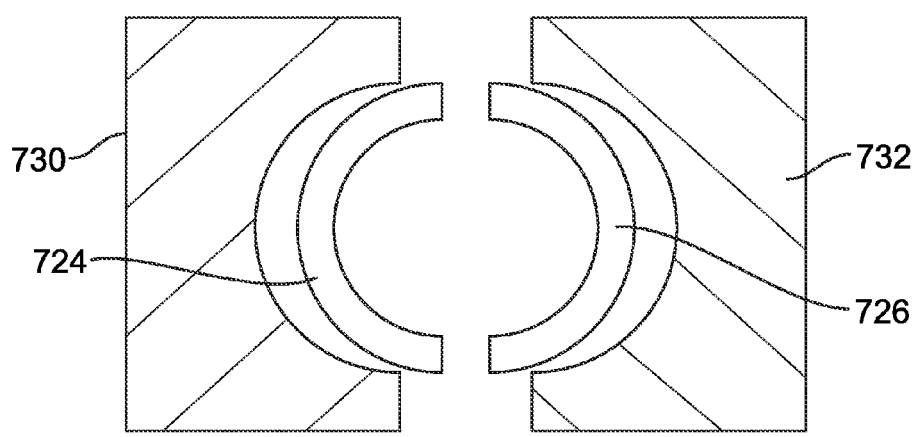
FIG. 22

GOLF BALL WITH THIN COVER AND METHOD OF MAKING GOLF BALL WITH THIN COVER

BACKGROUND

A wide range of technologies related to the design and manufacture of golf balls are known in the art. The material selected depends on the play conditions desired for the ball. The core material selected affects how the ball performs and how a golfer perceives the feel of the ball. It is desirable that the ball have a certain degree of compression and durability.

The cover also affects properties of the golf ball. For instance, it is desired that a cover have wear resistance so that the golf ball does not crack and wear prematurely. A certain degree of grip may also be desired between the cover and a club striking the golf ball, depending on whether the golf ball is being struck by an iron or being driven. In view of these considerations, it may be desirable to select a cover material which might provide both a degree of wear resistance and a degree of grip. However, it may be difficult to provide such a material because the selected material may exhibit properties that conflict with the properties of materials used in other layers of a golf ball.

Further, it may be desirable to improve the manufacturing efficiency of a process of making a golf ball by reducing the number of steps necessary to produce the golf ball and/or the amount of time necessary to manufacture the golf ball. For instance, it may be desirable to manufacture a golf ball using fewer pieces or layers but provides a performance similar to a golf ball having a more complex design. In addition, it may be desirable to provide a golf ball made from inexpensive materials.

SUMMARY

A golf ball with a thin cover layer and a method of manufacturing a golf ball with a thin cover is disclosed. A method of manufacturing a golf ball includes molding a cover preform in a first mold. The cover preform may be placed in a second mold. Material is injected into an interior of the cover preform. The cover preform may include an ionomer, a thermoplastic polyurethane, or a highly neutralized polymer. The injected material may be a highly neutralized polymer.

The material may force the cover preform against a surface of the second mold to form dimples in the cover. The surface of the second mold may include projections that form the dimples. The dimples may extend through the cover to form dimple structures in at least one layer between the cover and a center of the golf ball. For instance, the dimples may extend through the cover and into the injected material. The injected material may include a mantle layer. The mantle layer may include depressions having shapes corresponding to the dimples. An outer core may further include dimple structures, such as depressions having shapes corresponding to the depressions of the mantle.

The dimples may have a depth greater than a thickness of a thin cover. The thickness of a cover may depend upon different factors, such as the cover material, molding temperature, pressure exerted by material injected within the cover, and blow ratio. A thin cover 630 of golf ball 640 may have a thickness of less than approximately 1 mm. In another example, cover 630 may have a thickness of approximately 0.1 to 0.05 mm. In another example, cover 630 may have a thickness of approximately 0.1 to 0.005 mm. In another example, cover 630 may have a thickness of approximately 0.1 mm.

A cover preform may be formed, for example, by molding a parison, blow molding, vacuum molding, or a catheter inflated inside a parison. A cover preform may be formed from a single piece or from two or more pieces joined together.

In one aspect, a method of manufacturing a golf ball includes molding a cover preform in a first mold. The cover preform is placed in a second mold. Material is injected into an interior of the cover preform. The material forces the cover preform against a surface of the second mold to form dimples in the cover. The dimples extend through the cover to form dimple structures in at least one layer between the cover and a center of the golf ball.

In another aspect, a method of manufacturing a golf ball includes molding a cover preform. A material is injected into an interior of the cover preform to mold the cover preform into a cover that includes dimples. The dimples extend through the cover and into the injected material.

In another aspect, a golf ball includes a core and a cover. The cover includes dimples. The dimples have a depth greater than a thickness of the cover.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 7 shows a side cross-sectional view of a mold for forming a cover preform for a golf ball after the parison has been sealed.

FIG. 8 shows a side view of a product manufactured by a mold before trimming.

FIG. 9 shows a side view of the product manufactured by a mold after trimming.

FIG. 10 shows a side cross-sectional view of a mold for blow molding a cover preform for a golf ball.

FIG. 20 shows a side view of a product of a process for making a hemispherical section of a cover preform before trimming.

FIG. 21 shows a side view of a product of a process for making a hemispherical section of a cover preform after trimming.

FIG. 22 shows a side cross-sectional view of a mold for making a golf ball after hemispherical sections of a cover preform have been inserted into the mold.

DETAILED DESCRIPTION

The embodiments described herein regard a golf ball with a thin cover layer and a method of manufacturing a golf ball with a thin cover. A method of manufacturing a golf ball includes molding a cover preform in a first mold. The cover preform is placed in a second mold. Material is injected into an interior of the cover preform. The material forces the cover preform against a surface of the second mold to form dimples in the cover. The dimples may extend through the cover to form dimple structures in at least one layer between the cover and a center of the golf ball. For instance, the dimples may extend through the cover and into the injected material. Further, the dimples may have a depth greater than a thickness of the cover.

First, a discussion will be provided regarding golf ball constructions before discussing how multi-piece constructions having an inner core and outer core are generally made. Solid golf balls traditionally have multiple layers. While it is possible and economical to use a golf ball that is made of one solid material, such a one-piece ball typically exhibits low performance because golf balls having multiple layers are typically designed to allow a golfer to strike the ball such that it would fly longer or with greater control than a ball made of one solid material. Each layer of a golf ball is selected to provide one or more key characteristics for the golfer. The present embodiments also include multiple layers.

To provide a golf ball with a range of properties not normally exhibited by a one-piece solid golf ball, golf balls having a multi-piece construction have been developed. The different pieces of a multi-piece golf ball may be made of different materials that perform in different ways. For example, one piece of a multi-piece golf ball may provide a desired compression, while another piece may provide a durable cover. Exemplary embodiments of multi-piece golf balls will now be reviewed.

Figure 1:
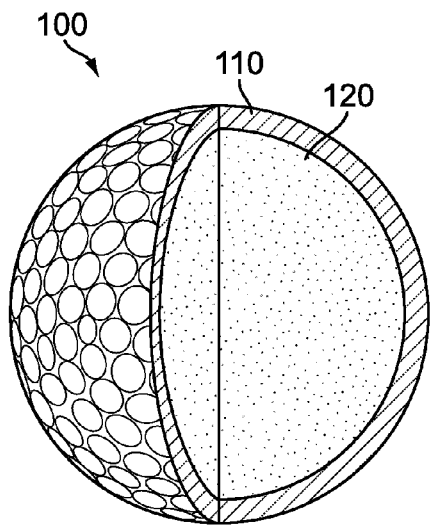
FIG. 1 shows a first representative golf ball in accordance with this disclosure, the golf ball being of a two-piece construction.

FIGS. 1-4 show various embodiments of multi-piece golf balls in accordance with this disclosure. FIG. 1 shows a first golf ball 100 having aspects in accordance with this disclosure. Golf ball 100 is a two-piece golf ball. Specifically, golf ball 100 includes cover layer 110 substantially surrounding core 120. Cover layer 110 may be formed of any golf ball cover material known in the art, which in some embodiments may be a resilient and durable material. For example, cover layer 110 may be formed of a material that compresses/flexes when struck by a golf club, in order to provide spin of the ball and feel to the player. Although resilient, the material may also be durable, in order to withstand scuffing from the club and/or the golf course.

FIG. 1 illustrates the outer surface of cover layer 110 as having a generic dimple pattern. While the dimple pattern on golf ball 100 may affect the flight path of golf ball 100, any suitable dimple pattern may be used with the disclosed embodiments. In some embodiments, golf ball 100 may be provided with a dimple pattern including a total number of dimples between approximately 250 and 450.

Figure 2:
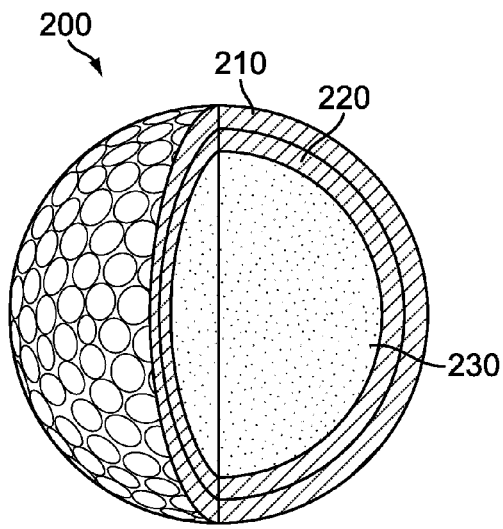
FIG. 2 shows a second representative golf ball, the golf ball having a mantle layer and an outer cover layer.

FIG. 2 shows a second golf ball 200 having aspects in accordance with this disclosure. Golf ball 200 includes a core 230, a mantle layer 220 substantially surrounding core 230, and an outer cover layer 210 substantially surrounding mantle 220.

Figure 3:
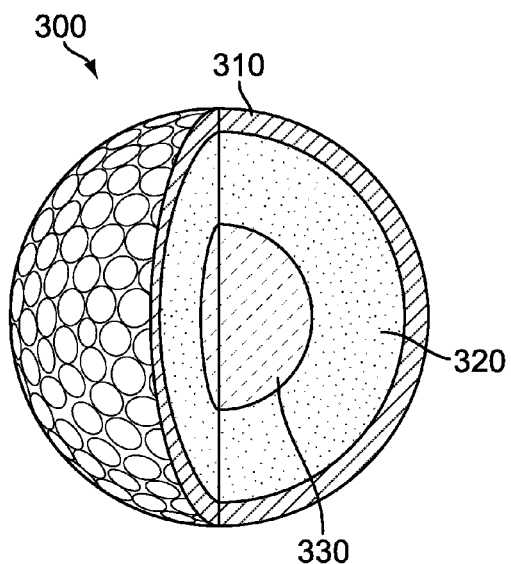
FIG. 3 shows a third representative golf ball, the golf ball having an inner core and an outer core.

FIG. 3 shows a third golf ball 300 having aspects in accordance with this disclosure, where third golf ball 300 has a three-piece construction. Three-piece golf ball 300 includes a first inner core 330, a first outer core 320 substantially surrounding first inner core 330, and a first cover layer 310 substantially surrounding first outer core layer 320.

Figure 4:
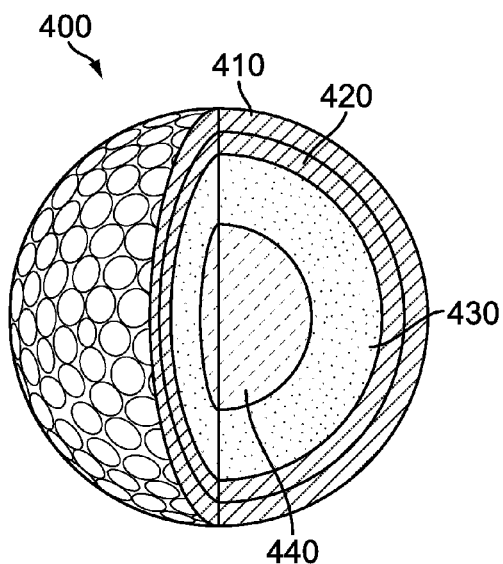
FIG. 4 shows a fourth representative golf ball, the golf ball having an inner core, an outer core, a mantle layer, and an outer cover layer.

FIG. 4 shows a fourth golf ball 400 having aspects in accordance with this disclosure, where fourth golf ball 400 has a four-piece construction. Golf ball 400 includes a second inner core layer 440, a second outer core layer 430 substantially surrounding second inner core layer 440, a mantle layer 420 substantially surrounding outer core layer 430, and an outer cover layer 410 substantially surrounding mantle layer 420.

Generally, the term "core" as used herein refers to at least one of the innermost structural components of the golf ball. The term core may therefore refer, with reference to FIG. 3 but applicable to any embodiment discussed herein, to (1) first inner core 330 only, (2) both first inner core 330 and first outer core 320 collectively, or (3) first outer core 320 only. The term core may also encompass more than two layers if, for example, an additional structural layer is present between first inner core 330 and first outer core 320 or encompassing first outer core 320.

A core may be formed from thermosetting or thermoplastic materials, such as polyurethane, polyurea, partially or fully neutralized ionomers, thermosetting polydiene rubber, such as polybutadiene, polyisoprene, ethylene propylene diene monomer rubber, ethylene propylene rubber, natural rubber, balata, butyl rubber, halobutyl rubber, styrene butadiene rubber or any styrenic block copolymer, such as styrene ethylene butadiene styrene rubber, etc., metallocene or other single site catalyzed polyolefin, polyurethane copolymers, e.g. with silicone.

In addition to the materials discussed above, compositions for portions of a golf ball, such as the core, cover, or any intermediate layer (a layer between the innermost core and the outermost cover layer) may incorporate one or more polymers. Examples of suitable additional polymers include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene catalyzed polymers, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species. Suitable polyamides for use as an additional material in compositions within the scope of the present invention also include resins obtained by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46.

Other materials suitable for use as a material in compositions include polyester elastomers marketed under the tradename SKYPEL by SK Chemicals of Republic of Korea, or diblock or triblock copolymers marketed under the tradename SEPTON by Kuraray Corporation of Kurashiki, Japan, and KRATON by Kraton Polymers Group of Companies of Chester, United Kingdom. All of the materials listed above can provide for particular enhancements to ball layers prepared within the scope of the present invention.

Ionomers also are well suited as a golf ball material, by itself or in a blend of compositions. Suitable ionomeric polymers (i.e., copolymer- or terpolymer-type ionomers) include α-olefin/unsaturated carboxylic acid copolymer-type ionomeric or terpolymer-type ionomeric resins. Copolymeric ionomers are obtained by neutralizing at least a portion of the carboxylic groups in a copolymer of an α-olefin and an α,β-unsaturated carboxylic acid having 3 to 8 carbon atoms, with a metal ion. Examples of suitable α-olefins include ethylene, propylene, 1-butene, and 1-hexene. Examples of suitable unsaturated carboxylic acids include acrylic, methacrylic, ethacrylic, α-chloroacrylic, crotonic, maleic, fumaric, and itaconic acid. Copolymeric ionomers include ionomers having varied acid contents and degrees of acid neutralization, neutralized by monovalent or bivalent cations discussed above.

Terpolymeric ionomers are obtained by neutralizing at least a portion of carboxylic groups in a terpolymer of an α-olefin, and an α,β-unsaturated carboxylic acid having 3 to 8 carbon atoms, and an α,β-unsaturated carboxylate having 2 to 22 carbon atoms with metal ion. Examples of suitable α-olefins include ethylene, propylene, 1-butene, and 1-hexene. Examples of suitable unsaturated carboxylic acids include acrylic, methacrylic, ethacrylic, α-chloroacrylic, crotonic, maleic, fumaric, and itaconic acid. Examples of suitable α,β-unsaturated carboxylates include methyl acrylate, ethyl acrylate and n-butyl acrylate. Terpolymeric ionomers include ionomers having varied acid contents and degrees of acid neutralization, neutralized by monovalent or bivalent cations as discussed above. Examples of suitable ionomeric resins include those marketed under the name SURLYN® manufactured by E.I. du Pont de Nemours & Company of Wilmington, Del., and IOTEK® manufactured by Exxon Mobil Corporation of Irving, Tex.

Silicone materials also are well suited for use in golf balls, either alone or as a component in a blend of materials. These can be monomers, oligomers, prepolymers, or polymers, with or without additional reinforcing filler. One type of silicone material that is suitable can incorporate at least 1 alkenyl group having at least 2 carbon atoms in theft molecules. Examples of these alkenyl groups include, but are not limited to, vinyl, allyl, butenyl, pentenyl, hexenyl and decenyl. The alkenyl functionality can be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl and hexyl; cycloalkyl groups, such as cyclohexyl and cycloheptyl; aryl groups, such as phenyl, tolyl and xylyl; aralkyl groups, such as benzyl and phenethyl, and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include the following: trimethylsiloxy-endblocked dimethylsiloxane-methylhexenylsiloxane copolymers; dimethylhexenlyisiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and the copolymers listed above, in which at least one end group is dimethylhydroxysiloxy. Commercially available silicones suitable for use in compositions within the scope of the present invention include Silastic by Dow Corning Corp. of Midland, Mich., Blensil by GE Silicones of Waterford, N.Y., and Elastosil by Wacker Silicones of Adrian, Mich.

Other types of copolymers also can be added to compositions within the scope of the present invention. Examples of copolymers comprising epoxy monomers and which are suitable for use within the scope of the present invention include styrene-butadiene-styrene block copolymers, in which the polybutadiene block contains an epoxy group, and styrene-isoprene-styrene block copolymers, in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd. of Osaka, Japan.

Next, a general discussion will be provided of the manufacture of a golf ball having a thin cover layer. It may be desirable to select a cover material which might provide both a degree of wear resistance and a degree of grip. Such a material, however, may differ from other materials selected for other components or layers of a golf ball. The different materials within a golf ball may provide different properties that address the considerations noted above.

For instance, the material for a cover may be harder or have a different density than the material for a mantle or core. Such a difference in properties may cause the different materials to provide effects that may counter the desired effects of materials of other layers. For example, a cover which has been designed to be wear resistant may affect the overall feel of the golf ball when the ball is struck. Further, it may be desirable to manufacture a golf ball using fewer pieces or layers but provides a performance similar to a golf ball having a more complex design. A golf ball may also be made from inexpensive materials but still perform similarly to golf balls made from more expensive materials. To address these issues, an aspect of the embodiments described herein is to include a thin cover layer. A thin cover layer may exhibit the desired effects for a cover noted above while minimizing the effect of the cover on other layers of a golf ball, as well as the overall performance of a golf ball.

One method of forming a thin cover layer uses molding to shape a parison into a hollow cover. A parison may be made from any suitable material for a cover, such as the materials described above. The parison may be in the form of a thin sheet of cover material. The sheet may have a round, generally tubular shape with a hollow interior. In another instance, the sheet may have a flat, generally planar shape.

Figure 5:
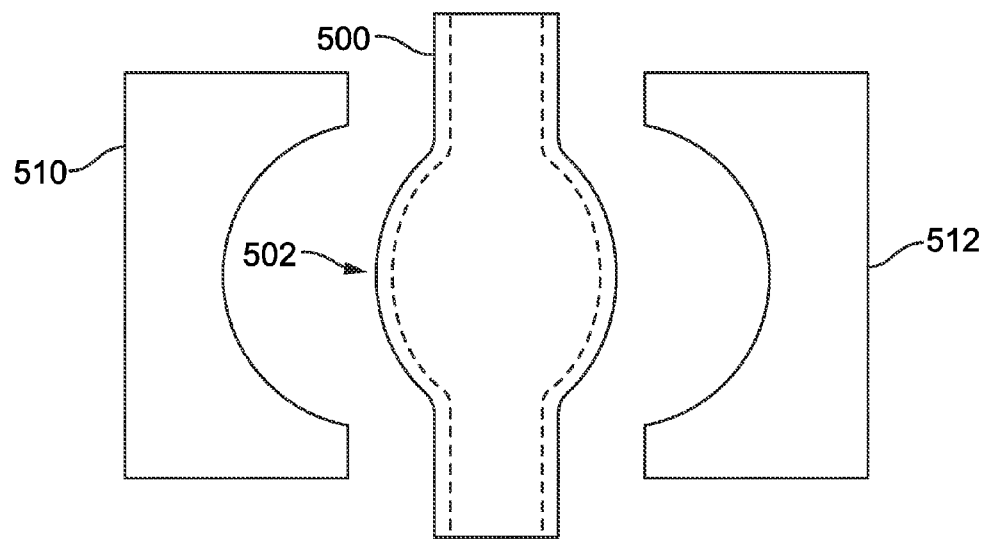
FIG. 5 shows a side cross-sectional view of a mold for forming a cover preform for a golf ball after a parison has been inserted into the mold.

Turning to FIG. 5, a parison 500 is shown placed between a first mold section 510 and a second mold section 512. In the example of FIG. 5, parison 500 has a generally tubular shape with a hollow interior and a rounded portion 503 where the parison 500 is enlarged in its central region. Parison 500 may be aligned with first mold section 510 and second mold section 512 so that rounded portion 502 is placed within the cavities of first mold section 510 and second mold section 512.

Parison 500 may have a small thickness to provide a thin cover that is molded from parison 500. For example, parison 500 may have a thickness of approximately 1 mm. In another example, parison 500 may have a thickness of approximately 0.6 to 0.006 mm. In another example, parison 500 may have a thickness of approximately 0.15 to 0.006 mm. In another example, parison 500 may have a thickness of approximately 0.15 mm.

Figure 6:
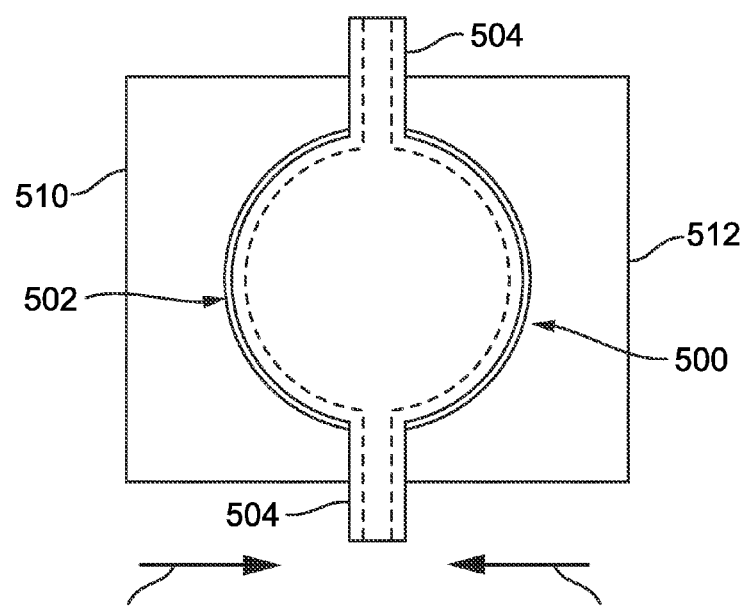
FIG. 6 shows a side cross-sectional view of a mold for forming a cover preform for a golf ball after the mold has been closed.

As shown in FIG. 6, first mold section 510 and second mold section 512 may be closed upon parison 500 with excess portions of parison 500 extending between first mold section 510 and second mold section 512. First mold section 510 may be moved in direction 6 and section mold section 512 may be moved in direction 8 to close first mold section 510 and second mold section 512 upon excess portions 504 of parison 500 placed between first mold section 510 and second mold section 512. The closure of first mold section 510 and second mold section 512 may apply pressure to parison 500, causing parison 500 to form seals 503 between excess portions 504 of parison 500 and rounded portion 502, as shown in FIG. 7. For example, the closure of first mold section 510 and second mold section 512 may apply pressure to excess portions 504 between first mold section 510 and second mold section 512. First mold section 510 and second mold section 512 may be heated to effect sealing of the material of parison 500 and form seals 503. For instance, both heat and pressure from first mold section 510 and second mold section 512 may be used to form seals 503 in parison 500.

Due to the closure of first mold section 510 and second mold section 512 upon parison 500, excess portions 504 of parison 500 may be pinched and reduced in thickness relative to rounded portion 502. This may result in a molded product with rounded portion 502 that has a generally spherical shape with excess portions 504, as shown in FIG. 8. Seals 503 may separate excess portions 504 from rounded portion 502 and may fluidally seal rounded portion 502. Once parison 500 has been molded and removed from first mold section 510 and second mold section 512, excess portions 504 may be removed to provide a cover preform 530, as shown in FIG. 9. Cover preform 530 has a generally spherical shape and is similar in shape and size to a cover of a golf ball. However, cover preform 530 does not include dimples after the molding process shown in FIGS. 5-9.

Cover preform 530 shown in FIG. 9 has a hollow interior 532. Hollow interior 532 may include an amount of air trapped within cover preform 530 during the process of FIGS. 5-9. In another example, interior 532 of cover preform 530 may be evacuated to a degree during molding of cover preform 530 so that any air or other fluid trapped within interior 532 of cover preform 530 does not interfere with a subsequent operation to fill interior 532 of cover preform 530, which may require displacing the air or fluid trapped within interior 532 of cover preform 530.

As described above, parison 500 may be simply molded to a desired shape of a cover preform 530 during the process of FIGS. 5-9 without the injection of air or another fluid into an interior of parison 500 during the molding process. Although it may not be necessary to inflate parison 500 during the molding of cover preform, parison 500 may be at least partially inflated during the molding process to form cover preform 530. For example, the molding process to mold parison 500 into cover preform 530 may be blow molding. In a blow molding process, cover preform 530 may be inflated with air, an inert gas, or another fluid to assist with shaping parison 500 to a desired shape of cover preform 530. Such an inflation operation may be carried out, for example, by inserting a needle 550 into rounded portion 502 after seals 503 have been formed, as shown in FIG. 10. Air, inert gas, or another fluid may be supplied through needle 550 and into the interior of rounded portion 502. The pressure provided by the air or other fluid may force the wall of rounded portion 502 against the cavity walls of first mold section 510 and second mold section 512 to provide a desired shape of cover preform 530. Fluid injected into interior 532 of cover preform 530 may be removed after molding of cover preform 530 and prior to filling cover preform 530, or may be simply displaced by material injected into cover preform 530 during a subsequent filling operation of cover preform 530, which will now be discussed.

Figure 11:
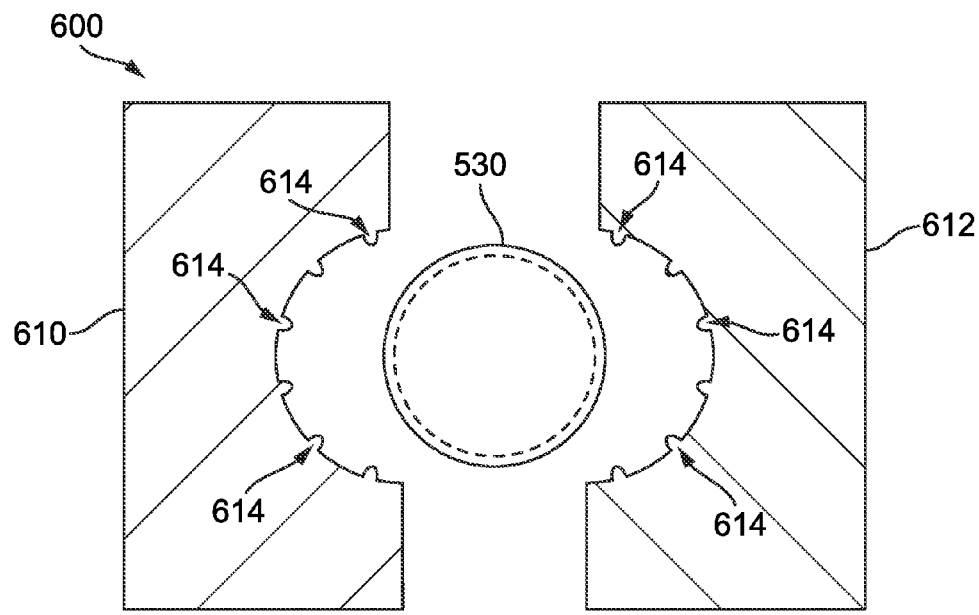
FIG. 11 shows a side cross-sectional view of a mold for making a golf ball after a cover preform has been inserted into a mold.
Figure 12:
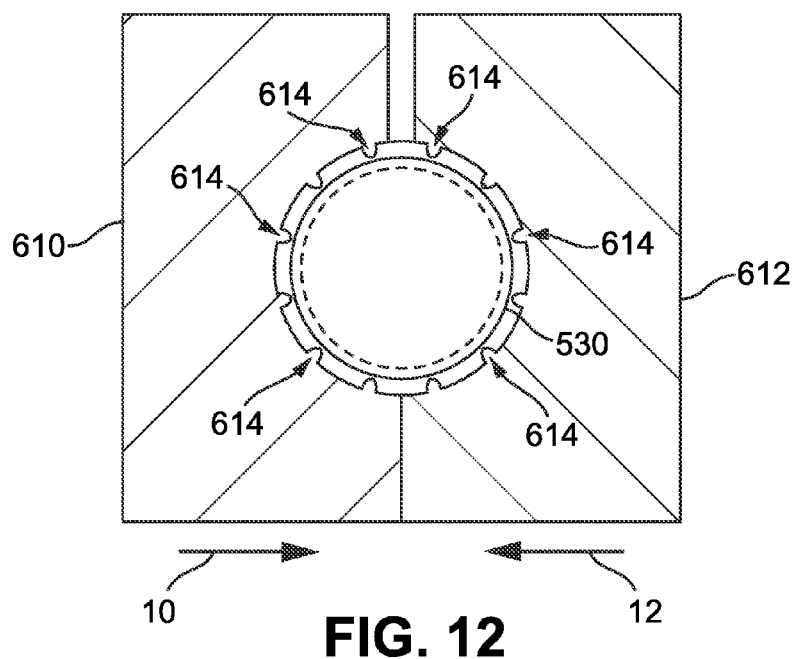
FIG. 12 shows a side cross-sectional view of a mold for making a golf ball after the mold has been closed with the cover preform inside the mold.

Once cover preform 530 has been manufactured, cover preform 530 may be further processed to form a golf ball. Turning to FIG. 11, cover preform 530 may be placed within a mold 600 between first mold section 610 and second mold section 612. Each of first mold section 610 and second mold section 612 may include projections 614 that extend toward cover preform 530, as shown in FIG. 11. Once cover preform 530 has been placed within mold 600, first mold section 610 may be moved in direction 10 and second mold section 612 may be moved in direction 12 to close mold 600 with cover preform 530 inside, as shown in FIG. 12.

Mold 600 may include a device to inject material into an interior of cover preform 530. For instance, once closed, first mold section 610 and second mold section 612 may cooperate to form a passage 620. In another example, either of first mold section 610 or second mold section 612 may form a passage. In another example, mold 600 may include multiple devices to inject material into an interior of cover preform 530, such as multiple passages in first mold section 610 and/or second mold section 612.

Figure 13:
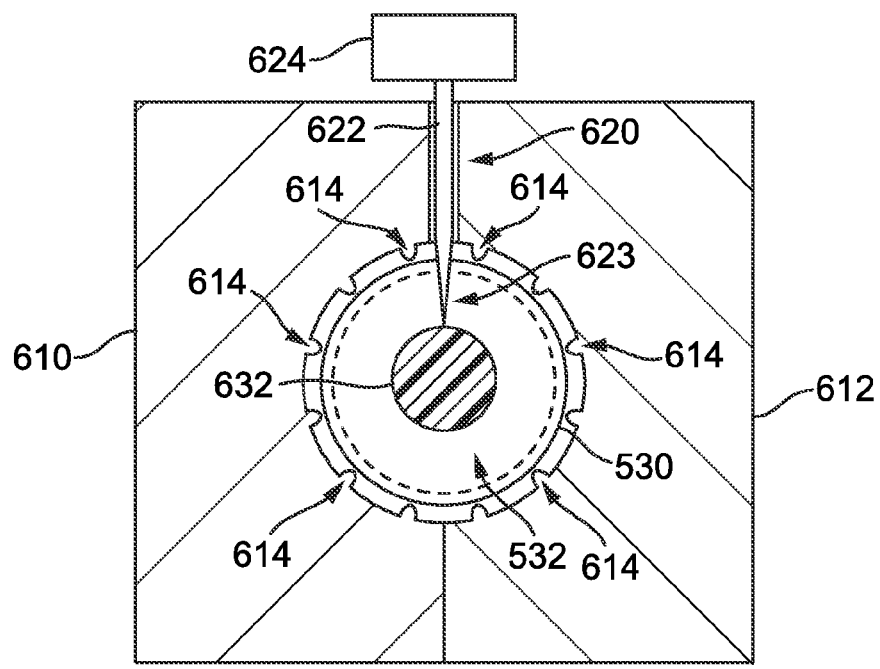
FIG. 13 shows a side cross-sectional view of a mold for making a golf ball once material has been injected into an interior of the cover preform.

One type of device that may be used to inject material into an interior of cover preform 530 is a needle. As shown in the example of FIG. 13, a needle 622 may be inserted into passage 610 and pierced through cover preform 530. Needle 622 may be fluidly connected to a reservoir 624 containing material to be injected into the interior of cover preform 530. Once mold 600 has been closed about cover preform 530, needle 622 may be advanced through passage 620 until a tip 623 of needle pierces cover preform 530 and reaches the interior of cover preform 530. Subsequently, material 632 may be supplied from reservoir 624 and through needle 622 into the interior of cover preform 530, as shown in FIG. 13. Although the example of FIG. 13 shows a single needle 620 being used to inject material 632 into the interior of cover preform 530, multiple needles 622 may be used to inject material 632. Furthermore, other devices used in the art may be employed to inject or otherwise supply material 632 to the interior of cover preform 530.

Material 632 may be in a molten or semi-molten state so that material 632 may be injected through needle 622 and into cover preform 530. Material 632 may include any of the golf ball materials discussed above. For example, material 632 may be selected as a core material, such as a material to provide core 120 of golf ball 100 in FIG. 1.

Figure 14:
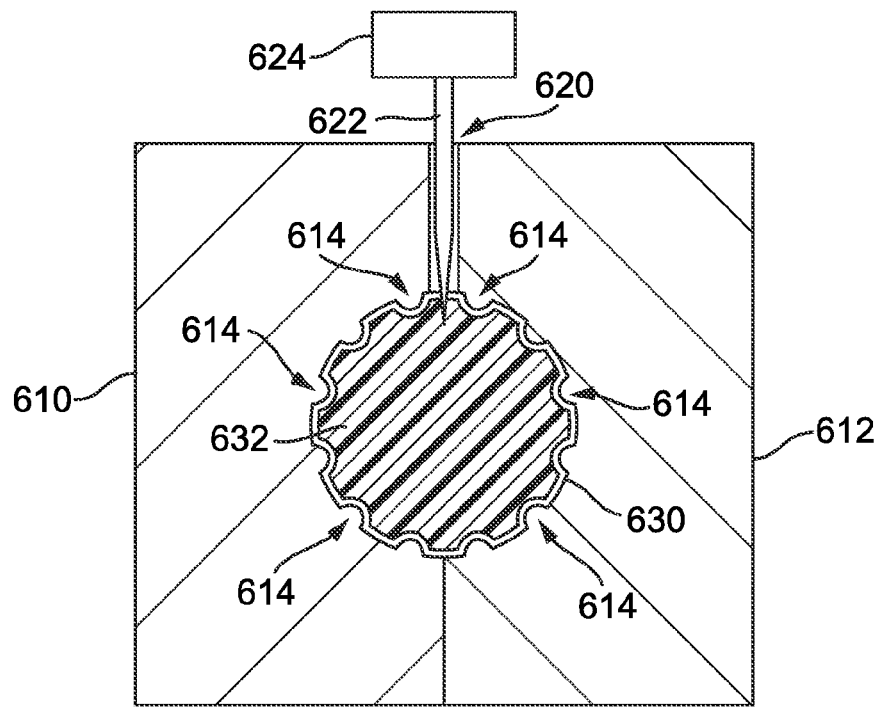
FIG. 14 shows a side cross-sectional view of a mold for making a golf ball after the injected material has pressed the cover preform against the interior surface of the mold.

As material 632 is supplied into the interior of cover preform 530, material 632 may press against the interior surface of cover preform 530. This may cause cover preform 530 to expand and be pressed against the interior surface of mold 600, including projections 614. The heat of material 632, due to its molten or semi-molten state, may also cause cover preform 530 to expand and be pressed against projections 614, as shown in FIG. 14. For instance, the heat of material 632 may soften the material of cover preform 530. Further, mold 600 may be heated to facilitate the expansion and molding of cover preform 530 within mold 600.

Projections 614 may have a shape corresponding to a desired dimple shape for a golf ball cover. Projections 614 may also be provided in a number corresponding to a desired number of dimples in a golf ball cover. By causing cover preform 530 to expand and be pressed against projections 614, cover preform 530 is molded by the inner surface of mold 600 and projections 614 to form a cover 630 with a dimple pattern corresponding to the number and location of projections 614. Once molding is complete, needle 622 is withdrawn from cover 630. If necessary, a hole made by needle 622 may be plugged or otherwise sealed. In another instance, the heat and pressure of the molding process may be sufficient to cause self-sealing of a hole caused by needle 622 or other device supplying material 632 to the interior of cover preform 530, such as by fusing the material of cover preform 530 together to seal the hole.

Figure 15:
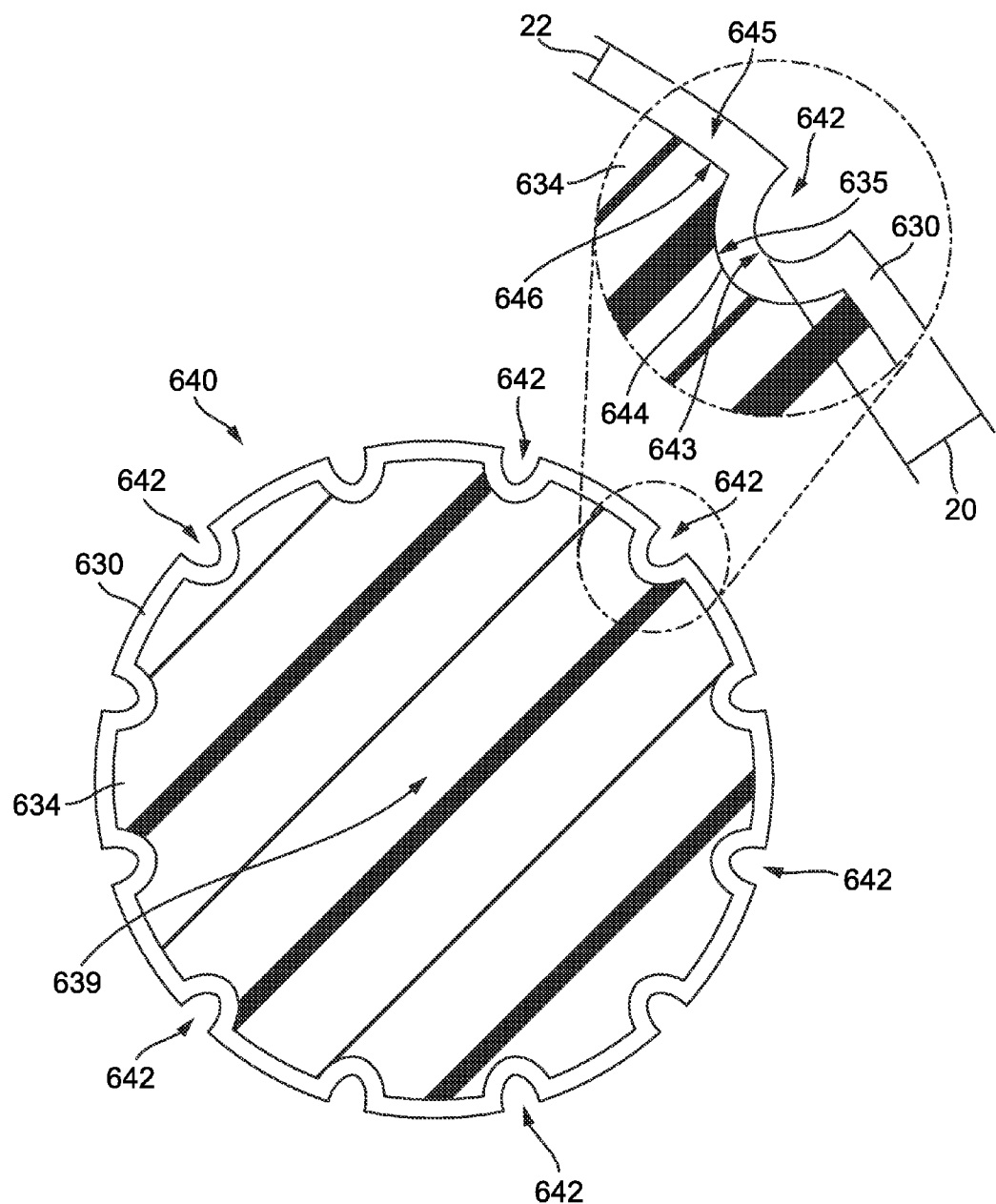
FIG. 15 shows a side cross-sectional view of a product of a molding process in which material has been injected into the interior of a cover preform.

Turning to FIG. 15, a golf ball 640 made by the process of FIGS. 11-14 is shown. Golf ball 640 includes cover 630 and core 634. Cover 630 may include any of the golf ball materials discussed above, including thermoplastic materials. For example, cover 630 may be an ionomer, thermoplastic polyurethane (TPU), or a highly neutralized polymer (HNP). Core 634 is formed by material 632 injected into the interior of cover preform 530, which subsequently hardens to form core 634. Core 634 may include any of the golf ball materials discussed above. For example, core 634 may be a HNP.

Cover preform 530 may stretch and become thinner during the process shown in FIGS. 10-13. The thickness of a cover may depend upon different factors, such as the cover material, molding temperature, pressure exerted by material injected within the cover, and blow ratio. In another example, cover preform 530 may maintain approximately the same thickness during the process of FIGS. 10-13. Cover 630 of golf ball 640 may have a thickness of less than approximately 1 mm. In another example, cover 630 may have a thickness of approximately 0.1 to 0.05 mm. In another example, cover 630 may have a thickness of approximately 0.1 to 0.005 mm. In another example, cover 630 may have a thickness of approximately 0.1 mm. Further, the thickness of cover 630 might not be uniform but instead may include variation.

Cover 630 includes dimples 642 formed by projections 614 of mold 600. Dimples 642 may have a depth of approximately 0.1 mm to 0.35 mm (approximately 0.004 inches to 0.014 inches). In another example, dimples 642 may have a depth of approximately 0.2 mm to 0.25 mm (approximately 0.008 inches to 0.01 inches). In another example, dimples 642 may have a depth of approximately 0.025 mm (approximately 0.01 inches). The depth of dimples 642 may be selected to affect the performance of golf ball 640. For instance, the depth of dimples may be selected to affect the aerodynamics of golf ball 640 and how golf ball 640 performs in different weather conditions. For example, dimples 642 may be provided with a deep depth to generally provide lower trajectories when driven. Deep dimple depths may also be desired when weather conditions are good and higher club speeds are used. Dimples 642 may be provided with a shallow dimple depth to generally provide higher trajectories when driven. Shallow dimple depths may also be desired when wet weather is encountered and slower club speeds are used.

For instance, dimples may be deep relative to a thickness of a cover. Due to the small thickness of cover 630, dimples 642 may have a depth greater than the thickness of cover 630. For example, as shown in the enlarged portion of FIG. 15, dimple 642 may have a depth 20, while cover 630 has a thickness of 22, with thickness 22 of cover 630 being less than depth 20 of dimple 642. In other words, a bottom 643 of a dimple 642 may extend past a portion 645 of cover 630 extending along a surface of golf ball 640 so that bottom 643 of dimple 642 is at a location closer to a center 639 of golf ball 640 than portion 645 of cover 630. For instance, bottom 643 of dimple 642 may extend past an interface 646 between portion 645 of cover 630 extending along a surface of golf ball 640 and the layer underneath cover 630 (i.e., core 634 in FIG. 15), with bottom 643 being at a location closer to a center 639 of golf ball 640 than interface 646.

Due to the small thickness of cover 630, dimples 642 may extend through one or more layers of a golf ball. In other words, dimples 642 may extend through cover 630 to layers underneath cover 630, such as one or more layers located between cover 630 and center 639 of golf ball 640. For example, dimples 642 may extend through cover 630 at least to core 634, as shown in the enlarged portion of FIG. 15. As a result, core 634 may include depressions 635 caused by cover 630 being forced into core 634 by projections 614 during the process described above. Depressions discussed herein may also be referred to as dimples. Depressions 635 may have a shape corresponding to the shape of dimples 642. For instance, depressions 635 may have a shape corresponding to an inner surface 644 of cover 630 where dimple 642 is located, as shown in the enlarged portion of FIG. 15. Thus, both cover 630 and core 634 may have dimple structures, such as dimples 642 and depressions 635, respectively.

In another example, dimples 642 need not have a depth greater than the thickness of cover 630 to extend through one or more layers of a golf ball. For instance, dimple 642 may have a depth 20 that is less than thickness 22 of cover 630. As a result, a portion 645 of cover 630 extending along a surface of golf ball 640 may be at a location closer to a center 639 of golf ball 640 than bottom 643 of a dimple 642. In other words, bottom 643 of dimple 642 need not extend past interface 646 between portion 645 of cover 630 extending along a surface of golf ball 640 and the layer underneath cover 630. However, although dimples 642 need not have a depth greater than the thickness of cover 630, core 634 may include depressions 635 caused by cover 630 being forced into core 634 by projections 614 during the process described above.

Figure 16:
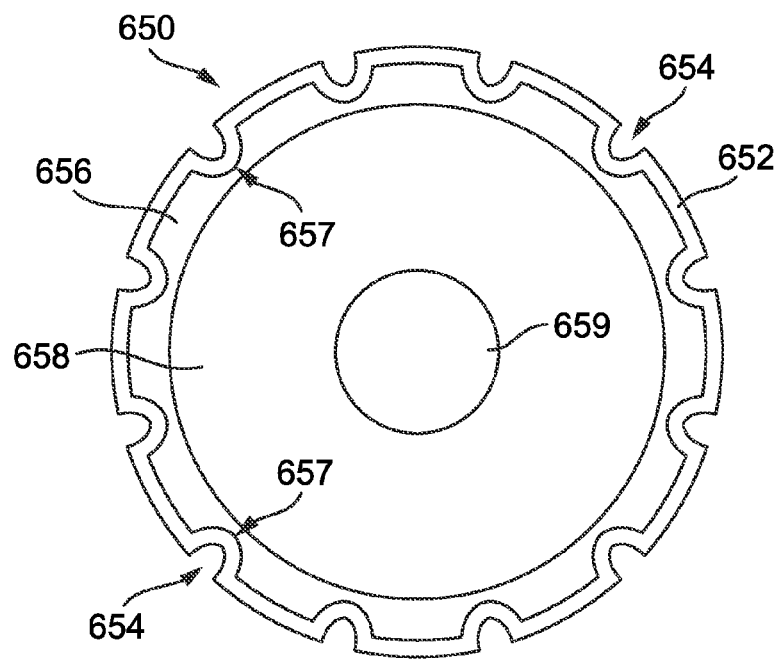
FIG. 16 shows a side cross-sectional view of a product of a molding process that includes an inner core, an outer core, and a mantle.

As described above in reference to FIGS. 1-4, a golf ball may include more than two pieces. Golf balls with thin covers may include any of the structures described in FIGS. 1-4, although other golf ball structures known in the art may be made to include a thin cover according to the embodiments described herein. Turning to FIG. 16, a golf ball 650 may include a cover 652 with dimples 654, a mantle 656, an outer core 658, and an inner core 659. Cover 652 may be formed according to the embodiments described in this application. For example, cover 652 may be formed by a preform that is provided as separate pieces and placed around one or more pieces of golf ball 650, such as inner core 659 or a combination of inner core 659 and outer core 658. As described above, dimples 654 may have a depth greater than the thickness of cover 652, or dimples 654 may have a depth less than the thickness of cover 652. Further, dimples 654 extend to layers beneath cover 652, such as mantle 656. For example, mantle 656 may include depressions 657 corresponding to dimples 654.

Figure 17:
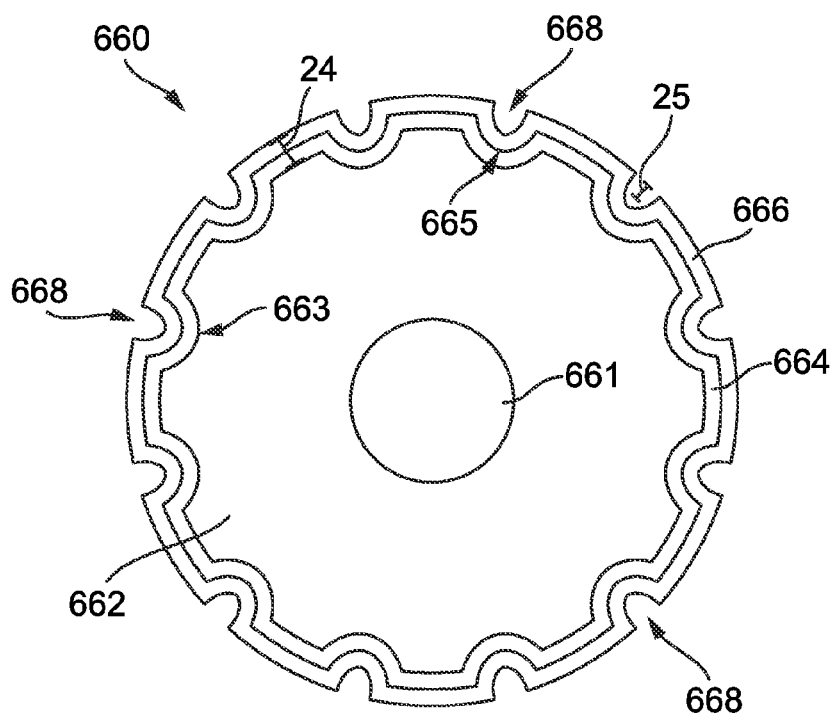
FIG. 17 shows a side cross-sectional view of a molded golf ball with dimples extending through a cover and into a mantle and an outer core.

The dimples of a golf ball may extend through more than two layers. Turning to FIG. 17, a golf ball 660 may include an inner core 661, an outer core 662, a mantle 664, and a cover 666 with dimples 668. Cover 666 may be formed according to the embodiments described in this application. For example, cover 666 may be formed by a preform that is provided as separate pieces and placed around one or more pieces of golf ball 660, such as inner core 661 or a combination of inner core 661 and outer core 662. Cover 666 may have a thickness 25 that is less than the depth 24 of dimples 668. As described above, dimples 668 may have a depth greater than the thickness of cover 666, or dimples 668 may have a depth less than the thickness of cover 666. In addition, although dimples 668 may have a depth greater than the combined thickness of cover 666 and mantle 664, dimples 668 need not have a depth greater than the combined thickness of cover 666 and mantle 664. Due to the small thickness of cover 666, dimples may extend through cover 666 so that mantle 664 and outer core 662 includes dimple structures. For example, mantle 664 may include depressions 665 and outer core 662 may also include depressions 663. Depressions 665 of mantle 664 may have shapes corresponding to dimple 668, while depressions 663 of outer core 662 may have shapes corresponding to depressions 665 of mantle 664. In other words, depressions 663 of outer core 662 may have shapes corresponding to a surface of depressions 665 facing outer core 662.

Figure 18:
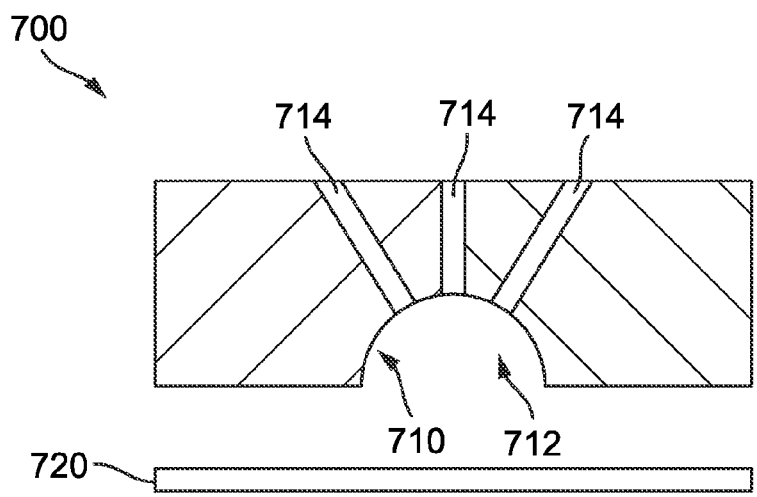
FIG. 18 shows a side cross-sectional view of a mold for forming a hemispherical section of a cover preform.

Although a cover preform may be formed by a molding or blow molding process, as described above with reference to FIGS. 10-13, a cover preform may be formed by other processes used in the art to make covers. For example, a vacuum molding process may be used to make a cover preform. Turning to FIG. 18, a vacuum mold 700 may be provided that includes a cavity 712 and one or more channels 714. Channels 714 may be connected to a pump (not shown) or other device to draw a vacuum through channels 714.

Figure 19:
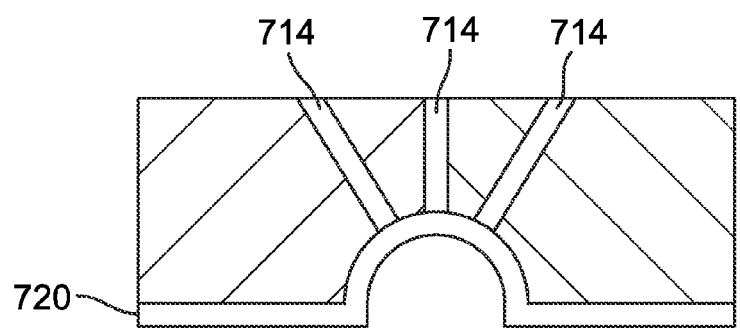
FIG. 19 shows a side cross-sectional view of a mold for forming a hemispherical section of a cover preform after a vacuum has drawn a sheet against a surface of the mold.

A sheet 720 of cover material, such as the golf ball materials described above, may be placed against mold 700 so that when a vacuum is drawn through channels 714, the air within cavity 712 is withdrawn to form a vacuum that draws sheet 720 into cavity 712 and against a surface 710 of mold 700, as shown in FIG. 19. Further, mold 700 may be heated to assist with the molding and shaping of sheet 720.

FIG. 20 shows an example of a product 720 made by vacuum mold 700. Product 720 may include a central, rounded portion 723 formed by shaping sheet 720 to the surface 710 of mold 700 and excess portions 722 that extended outside of cavity 712 of mold 700. A hemispherical section 724, as shown in FIG. 21, may be formed from product 720 by removing excess portions 722. Hemispherical section 724 may, for example, generally have a shape of half of a sphere. Thus, hemispherical section 724 may be combined with a second hemispherical section 724 to form a cover preform from two or more pieces, in contrast to the process of FIGS. 5-9, which forms cover preform 530 from a single piece.

Figure 23:
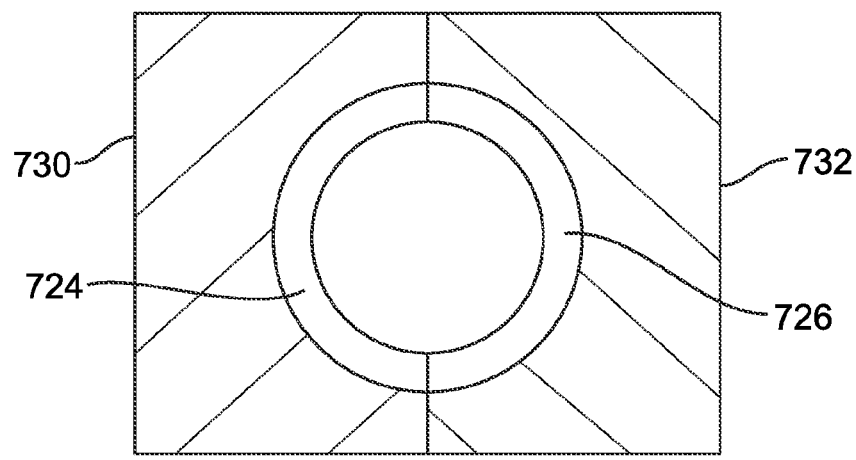
FIG. 23 shows a side cross-sectional view of a mold for making a golf ball after the mold has been closed upon hemispherical sections of a cover preform.
Figure 24:
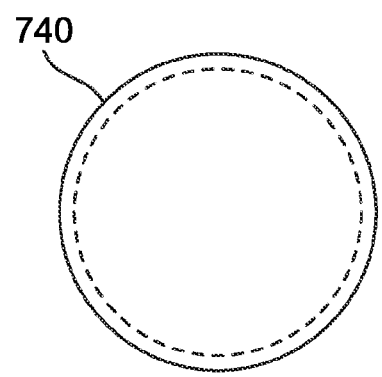
FIG. 24 shows a cover preform produced by a process of molding hemispherical sections of a cover preform together.

A first hemispherical section 724 and a second hemispherical section 726 may be subsequently placed between a first mold section 730 and a second mold section 732, as shown in FIG. 22. Second hemispherical section 726 may have a shape like hemispherical section 724 and be formed by the same process as first hemispherical section 724, as described above in regard to FIGS. 18-21. First mold section 730 and second mold section 732 may be closed together, as shown in FIG. 23, to force first hemispherical section 724 and second hemispherical section 726 together to join the hemispherical sections together. First mold section 730 and/or second mold section 732 may be heated to assist with joining first hemispherical section 724 and second hemispherical section together to provide a cover preform 740, as shown in FIG. 24. First hemispherical section 724 and second hemispherical section 726 may join to one another by, for example, fusing the material of first hemispherical section 724 and second hemispherical section 726 together. For example, first hemispherical section 724 and second hemispherical section 726 may be joined together by a welding process, such as via spin welding.

Figure 25:
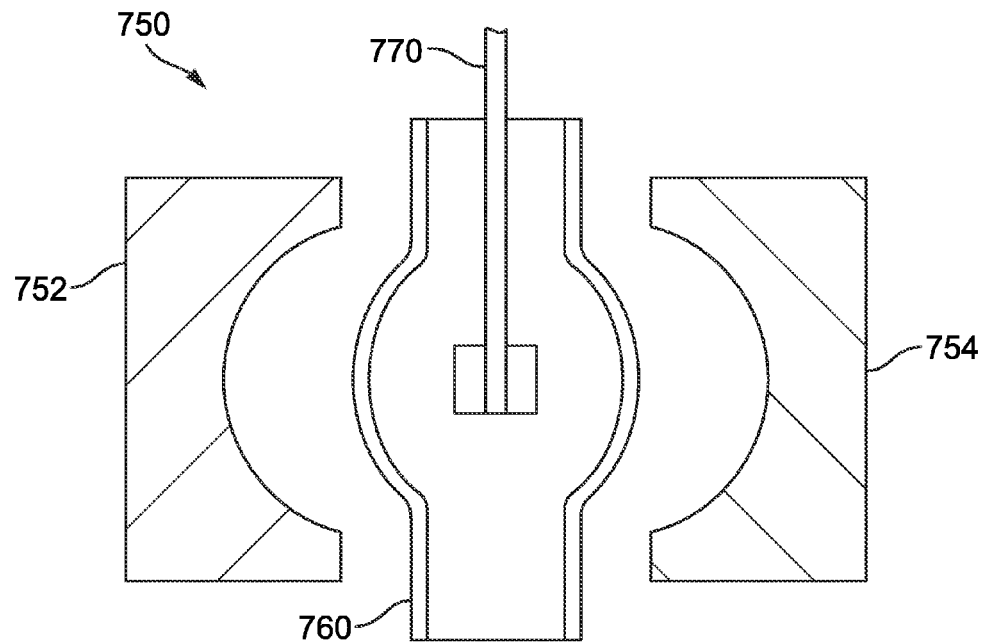
FIG. 25 shows a side cross-sectional view of a mold for making a cover preform after a parison has been inserted within the mold.

Another process that may be used to form a cover preform may include inflating a parison with a catheter. Turning to FIG. 25, a mold 750 may include a first mold section 752 and a second mold section 754. A parison 760 may be placed between first mold section 752 and second mold section 754. Parison 760 may have the shape and structure described above for parison 500 and may be made of the same materials.

Figure 26:
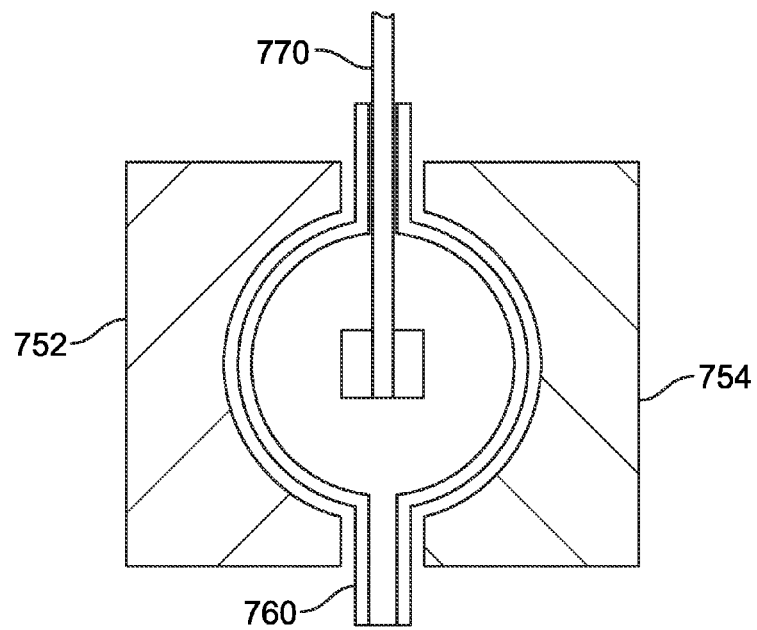
FIG. 26 shows a side cross-sectional view of a mold for making a cover preform after the mold has been closed on the parison.
Figure 27:
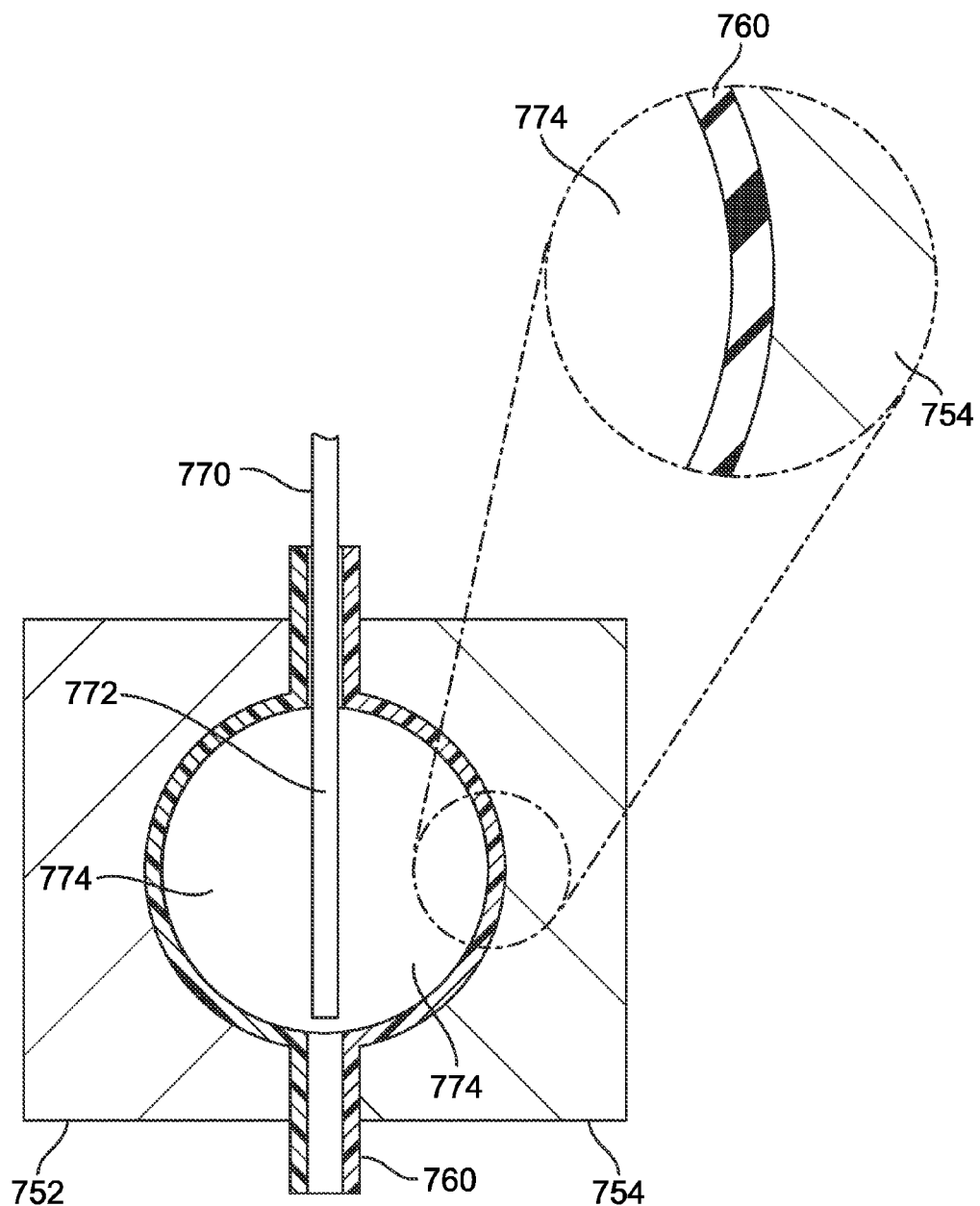
FIG. 27 shows a side cross-sectional view of a mold for making a cover preform after a parison has been inflated.

A catheter 770 may be inserted inside parison 760, as shown in FIG. 25. Subsequently, first mold section 752 and second mold section 754 may be brought together to close mold 750 on parison 760, as shown in FIG. 26. Once mold 750 has been closed, a fluid may be supplied through a tubular portion 772 of catheter 770 to inflatable portions 774 of catheter 770. Fluid may be air, a liquid, or other fluid used in the art. Fluid supplied through tubular portion 772 causes inflatable portions 774 to enlarge and be forced against parison 760. This in turn causes parison 760 to be forced against the interior surfaces of first mold section 752 and second mold section 754, as shown in FIG. 27. Mold 750 may also be heated to assist with the molding of parison 750 to form a cover preform (not shown). The product formed by this process is similar to that shown in the example of FIG. 8, and may include excess portions that may be removed to provide the cover preform.

In another example, a parison used in a blow molding operation may form more than one layer of a golf ball. For instance, a parison may form not only a cover but also a mantle layer. In such a case, a parison may be used in a blow molding operation to form cover 666 and mantle layer 664 shown in the example of FIG. 17, with the parison injected with material to form a core inside the mantle layer 664 and cover 666 provided by the parison. Dimples 668 formed in the parison may extend through cover 666 and may extend through mantle layer 664 to the core material. The dimples may have a depth greater than the cover and may even have a depth greater than a combined thickness of the cover and the mantle layer, or the dimples may have a depth less than the cover or less than the combined thickness of the cover and the mantle layer.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of manufacturing a golf ball, comprising:
    molding a cover preform in a first mold by inflating a parison with a catheter having at least one inflatable portion;
    placing the cover preform in a second mold; and
    injecting a material into an interior of the cover preform, wherein the material forces the cover preform against a surface of the second mold to form dimples in the cover and the material.

2. The method of claim 1, wherein the surface of the second mold includes projections that form the dimples when the material forces the cover preform against the surface of the second mold.

3. The method of claim 1, wherein the molding step includes forming the cover preform by blow molding.

4. The method of claim 3, wherein the molding step includes molding the cover preform from a single piece.

5. The method of claim 1, wherein the molding step includes forming the cover preform by vacuum molding.

6. The method of claim 5, wherein the molding step includes forming the cover preform from a plurality of hemispherical sections.

7. The method of claim 1, wherein the injecting step includes molding the dimples so the dimples extend through the cover and into a mantle layer formed by the injected material.

8. The method of claim 7, wherein the injecting step includes forming the mantle layer to include depressions having shapes corresponding to the dimples.

9. The method of claim 7, wherein the injecting step includes molding the dimples so the dimples further extend into an outer core.

10. The method of claim 9, wherein the outer core is formed to include depressions having shapes corresponding to the depressions of the mantle layer.

11. The method of claim 1, wherein the injecting step includes injecting the material into the interior of the cover preform by a needle pierced through the cover preform.

12. The method of claim 1, wherein the cover preform is made from a material selected from the group consisting of: an ionomer, a thermoplastic polyurethane, and a highly neutralized polymer.

13. The method of claim 1, wherein the cover preform is made from a thermoplastic polyurethane.

14. The method of claim 13, wherein the material is a heated material that softens the cover preform made from a thermoplastic polyurethane.

15. The method of claim 1, wherein the dimples have a depth of approximately 0.1 mm to 0.35 mm.

* * * * *